United States Patent [19]

Heuwinkel et al.

[11] Patent Number: 5,886,085
[45] Date of Patent: Mar. 23, 1999

[54] AQUEOUS COATING MEDIA AND THEIR USE IN SINGLE-LAYER AND MULTI-LAYER COATING PROCESSES

[75] Inventors: Heike Heuwinkel, Sprockhövel; Werner Lenhard; Hans-Peter Patzschke, both of Wuppertal; Bettina Vogt-Birnbrich, Solingen, all of Germany

[73] Assignee: Herberts GmbH, Wuppertal, Germany

[21] Appl. No.: 849,310

[22] PCT Filed: Dec. 15, 1995

[86] PCT No.: PCT/EP95/04967

§ 371 Date: Jun. 10, 1997

§ 102(e) Date: Jun. 10, 1997

[87] PCT Pub. No.: WO96/18693

PCT Pub. Date: Jun. 20, 1996

[30] Foreign Application Priority Data

Dec. 17, 1994 [DE] Germany ............... 44 45 200.4

[51] Int. Cl.⁶ ....................................... C08L 75/00
[52] U.S. Cl. .................. 524/507; 524/802; 524/804; 524/819; 524/813
[58] Field of Search ..................... 524/507, 802, 524/804, 813, 817

[56] References Cited

U.S. PATENT DOCUMENTS

| | | |
|---|---|---|
| 3,458,420 | 7/1969 | Spoor . |
| 4,086,193 | 4/1978 | Reischl . |
| 4,137,213 | 1/1979 | Kempter . |
| 4,197,224 | 4/1980 | Schmolzer et al. ............ 260/22 TN |
| 4,489,135 | 12/1984 | Drexler . |
| 4,851,460 | 7/1989 | Strangöner . |
| 4,857,580 | 8/1989 | Patzschke . |
| 5,015,688 | 5/1991 | Bederke . |
| 5,401,795 | 3/1995 | Brock . |

FOREIGN PATENT DOCUMENTS

| | | |
|---|---|---|
| 2017505 | 10/1991 | Canada . |
| 0 089 497 | 9/1983 | European Pat. Off. . |
| 0 251 772 | 1/1988 | European Pat. Off. . |
| 0 260 447 | 3/1988 | European Pat. Off. . |
| 0 438 090 | 7/1991 | European Pat. Off. . |
| 0 459 634 | 12/1991 | European Pat. Off. . |
| 0 297 576 | 1/1992 | European Pat. Off. . |
| 0 626 432 | 11/1994 | European Pat. Off. . |
| 0 684 286 | 11/1995 | European Pat. Off. . |
| 2 243 223 | 9/1973 | France . |
| 1546854 | 11/1970 | Germany . |
| 2 325 177 | 5/1973 | Germany . |
| 2 357 152 | 11/1973 | Germany . |
| 2 606 831 | 8/1977 | Germany . |
| 3 436 346 | 4/1986 | Germany . |
| 3 628 124 | 3/1988 | Germany . |
| 3 628 125 | 3/1988 | Germany . |
| 3 823 731 | 2/1990 | Germany . |
| 3 910 829 | 10/1990 | Germany . |
| 4 000 889 | 7/1991 | Germany . |
| 4 011 633 | 10/1991 | Germany . |
| 4 112 327 | 10/1992 | Germany . |
| 4 115 042 | 11/1992 | Germany . |

*Primary Examiner*—Edward J. Cain
*Attorney, Agent, or Firm*—Pillsbury Madison & Sutro LLP

[57] ABSTRACT

Coating media and their use in processes for producing single-layer and multi-layer coatings are described. The coating media contain an aqueous mixture comprising I. 99–70% by weight of a mixture of
   A) 50–100% by weight of one or more binder vehicles which at least in part contain ionic groups,
   B) 0–50% by weight of one or more crosslinking agents, which at least in part may contain ionic groups, for binder vehicle A), wherein the ionic groups which are present have the same charge as those of component A), and II. 1–30% by weight of one or more binder vehicles (component C), which are miscible both with the binder vehicles of component A) at the storage temperature and with each other at the curing temperature of the coating media and which contain ionic groups, the charge of which is opposite to the charge of the ionic groups of component I), wherein the percentages by weight are given with respect to the weight of resin solids in each case and wherein the proportions of components I) and II) are matched to each other so that 0.5 to 70% of the number of charges of the ionic groups of I) are neutralised by the charges of the ionic groups of II), and III. customary lacquer additives and/or pigments and/or extenders, and optionally one or more customary lacquer solvents.

13 Claims, No Drawings

AQUEOUS COATING MEDIA AND THEIR USE IN SINGLE-LAYER AND MULTI-LAYER COATING PROCESSES

FIELD OF THE INVENTION

This invention relates to aqueous coating media which are produced based on water-thinnable binder vehicle mixtures which contain ionic groups. They are suitable for the production of single-layer and multi-layer coatings, particularly in the motor vehicle sector.

BACKGROUND OF THE INVENTION

When water-thinnable resins, particularly aqueous basecoats, are pigmented, problems generally arise in that the pigments agglomerate or settle out. In order to produce stable water-thinnable lacquers, it is necessary that the pigments are satisfactorily wetted and are ground to a suitable particle size. The latter is generally less than 10 μm. When water-thinnable dispersions with a low content of solvent are used, these aqueous dispersions can be destroyed by the action of shear forces. It is therefore necessary in many cases to replace part of the binder vehicles by special binder vehicles, which are termed paste resins and in which the pigments are ground, in order to effect wetting of the pigment or additives. These pigment pastes may be solvent-containing or water-containing substances. They are subsequently mixed with the remaining water-thinnable binder vehicles and thus form the aqueous coating medium, e.g. a primer, a primer surfacer or a base lacquer.

At the same time, it is necessary that aqueous coating media are stable on storage. Therefore they must not settle out, and there should be no formation of agglomerations of binder vehicles or pigments, which impair the uniform smooth appearance of the coating on the subsequent application thereof.

Water-tinnable coating media for metallic base lacquers or binder vehicles therefor which have an anionic basis are described in EP-A-0 260 447, EP-A-0 297 576, DE-A-40 00 889 and EP-A-0 438 090, for example. Proportions of the anionic base resin or neutral melamin resins. are used here as paste resins for the grinding of pigments, for example, or special paste resins are used which contain carboxyl groups incorporated by reaction. After neutralisation and conversion of the binder vehicles into the aqueous phase, the pigments are ground. Coating media can be produced with these aqueous pigment pastes.

DE-A-40 11 633, DE-A-26 06 831 and EP-A-0 251 772 describe aqueous coating media based on cationic resins which are at least partially neutralised. These can be used as an electro-dip lacquer or as an aqueous base lacquer. The pigments are ground in a non-ionic wetting agent together with organic solvents, for example. These pigment pastes are then mixed with a binder vehicle which contains cationic groups and are subsequently diluted to form an aqueous coating medium. In addition, cationic paste resins are also described, e.g. epoxy resins containing sulphonium groups which are employed for the production of pigment pastes, which are then processed with cationic resins to form a cationic lacquer material.

The coating media which have been described hitherto therefore only comprise those with cationic or anionic binder vehicles which contain additives or paste resins comprising the same ionic groups or comprising non-ionic groups.

DE-A-38 23 731 describes aqueous, thermally curable coating media which contain at least two binder vehicles containing oppositely charged ionic groups. With these coating media it is essential that the binder vehicles which contain differently charged ionic groups are immiscible with each other at storage temperatures, i.e. below the curing temperature. Two separate resin phases are therefore present. The binder vehicles only become miscible under curing conditions, i.e. at elevated temperature. The amounts of resins have to be selected so that the numbers of different ionic groups are present in about the same order of magnitude.

EP-A-0 459 634 describes binder vehicles which contain, simultaneously, substituents which can be converted into anionic groups and substituents which can be converted into cationic groups. The anionic groups are neutralised and the binder vehicle is converted into the aqueous phase. After the addition of pigments and neutralising agents, coating media are obtained. Mixtures of resins which are neutralised differently are therefore not described. CA-A-2 017 505 describes binder vehicles for the coating of paper, which are produced by the emulsion polymerisation of monomers containing cationic groups in an aqueous solution of a polymeric dispersing agent which contains neutralised anionic groups. The dispersing agent has to be neutralised in excess with a volatile amine in order to obtain a stable emulsion. The dispersing agent is present in amounts such that salt formation occurs on heating after the paper has been coated, whereby a dry film is formed.

For water-thinnable binder vehicles which contain ionic groups and which are used in the lacquer industry, it is necessary to develop a pigment paste, the polarity of which is matched to that of the binder vehicles in each case. This results in a considerable amount of costly development work.

SUMMARY OF THE INVENTION

The object of the present invention is therefore to provide aqueous coating media based on ionic lacquer binder vehicles, to which paste resins can be added without problems, wherein the finished coating media are stable on storage and do not tend to coagulate or agglomerate. After application, the crosslinked coating medium should exhibit good resistance to the action of moisture, and should exhibit good adhesion and good inter-coat adhesion in multi-layer structures.

This object is achieved by an aqueous coating medium which contains an aqueous mixture comprising I. 99–70% by weight of
  A) 50–100% by weight of one or more binder vehicles which at least in part contain ionic groups,
  B) 0–50% by weight of one or more crosslinking agents , which at least in part may contain ionic groups, for binder vehicle A), wherein the ionic groups which are present have the same charge as those of component A), and II. 1–30% by weight of one or more binder vehicles (component C), which are miscible both with the binder vehicles of component A) both at the storage temperature and with each other at the curing temperature of the coating media and which in general are miscible within the range from –10° C. to 200° C., and which contain ionic groups, the charge of which is opposite to the charge of the ionic groups of component I), wherein the percentages by weight are given with respect to the weight of resin solids in each case and wherein the proportions of components I) and II) are matched to each other so that 0.5 to 70% of the number of charges of the ionic groups of I) are neutralised by the charges of the ionic groups of II), and III. customary lacquer additives and/or pigments and/or extenders, and optionally one or more customary lacquer solvents.

Component I (the sum of binder vehicle component A) and crosslinking component B)) preferably contains cationic groups corresponding to an amine number of 20 to 200 or anionic groups corresponding to an acid number of 5 to 80, and component C) preferably contains anionic groups corresponding to an acid number of 10 to 90 or cationic groups corresponding to an amine number of 10 to 150.

DETAILED DESCRIPTION OF THE INVENTION

The film-forming lacquer binder vehicles A) which are present in the coating media according to the invention may be anionic or cationic base resins. These are known, water-thinnable binder vehicles based on one or more poly(meth) acrylates, oil-free or fatty acid-modified polyesters, polyurethanes, polyurethane-urea resins, epoxy resins, polyamides and/or maleic anhydride-fatty acid reaction products which contain ionic groups incorporated by reaction. Either resins A1) which contain cationic groups are possible; such as those which contain $—NH_2$, $—NHR$, $—NR_2$, $—NR_3^+$, $—SR_3^+$ or $—PR_4^+$ for example, or resins A2) which contain anionic groups are possible, such as $—P(OR)_2OH$, $—SO_3H$, $—COOH$ for example. In the above formula, R represents an organic radical in each case, particularly an alkyl group which preferably contains 1 to 6 carbon atoms. Where a plurality of radicals R is present, these may be the same or different. The resins may be present individually or in admixture; they are self-crosslinking or are capable of reacting with additional crosslinking agents. It should be ensured that only resins of the same ionic charge are used together.

Examples of cationic binder vehicles A1) are described in DE-A-15 46 854, DE-A-23 25 177, DE-A-23 57 152 or in DE-A-40 11 633 in particular. These are resins which are based on ethylenically unsaturated monomers and which contain basic groups, for example, and which are hereinafter termed poly(meth)acrylate resins, which are produced by solution or emulsion polymerisation and which have a hydroxyl number of 0–450 and a number average molecular weight (Mn) of 500 to 50,000 as measured by gel permeation chromatography. Their glass transition temperature is preferably 50° to +150° C. The amine number of the binder vehicles is 20 to 200 mg KOH/g solid resin, preferably 20 to 150.

Practically all monomers which can be polymerised by a radical mechanism can be used as the ethylenically unsaturated monomers for these poly(meth)acrylate resins, wherein the usual conditions for copolymerisation, such as those which are predetermined by the copolymerisation parameters for example, are familiar to one skilled in the art. A poly(meth)acrylate resin is preferably used which is based on non-functional (meth)acrylate monomers together with (meth)acrylate monomers which contain functional groups, e.g. amino groups, hydroxyl groups and/or epoxide groups such as those described in DE-A-40 11 633, optionally with further monomers which can be copolymerised by a radical mechanism. A proportion of monomers which can be polymerised by a radical mechanism and which contain a plurality of unsaturated groups can also be used here.

Introduction of the ionic groups can be effected by a reaction analogous to polymerisation. For example, a process is described in DE-A-34 36 346 in which unsaturated monomers which contain hydroxyl groups are polymerised into the copolymer. Via these epoxide groups, amino groups, tertiary sulphonium groups or quaternary phosphonium salt groups can subsequently be introduced into the resin by the action of ammonia and/or monoamines, any desired sulphides, or aliphatic, aromatic or alicyclic phosphines. The amines, sulphides or phosphines are reacted with an acid and the epoxide conjointly, for example.

It is also possible to introduce onium groups directly by the polymerisation of monomers which already contain the quaternary ammonium group, quaternary phosphonium group or tertiary sulphonium group.

Another preferred group of basic binder vehicles is produced from polyesters. Examples of these are also described in DE-A-40 11 633. For example, these may be binder vehicles in which the amino group is introduced into the polyester as an amino alcohol by condensation, or is attached to the polymer chain by means of an addition polymerisation reaction. Thus, for example, one preferred linear polyester which contains OH groups can be synthesised by the reaction of the polyester with dialkylamino dialcohols and diisocyanates. If necessary, it is possible to extend the chains of the resulting reaction products with suitable compounds, such as polyamines or polyols for example.

Examples of dialkylamino alcohols which are particularly suitable include N,N-dimethylethanolamine and those of the 2-dialkylamino-2-ethyl-1,3-propanediol type, or 2-(2-azacycloalkylmethyl)-2-ethylpropanediol, such as 2-(dimethylamino-methyl)-2-ethyl-1,3-propanediol for example, as well as 3-dimethylaminopropanediol-1,2 and 3-diethylamino-propanediol-1,2. Other examples include methyl-diethanolamine, ethylpropanediolamine; mono-, bis- or polyoxyalkyated aliphatic, cycloaliphatic or heterocyclic primary amines such as N-methyldiethanolamine, N-ethyldiethanolamine, N-propyl-diethanolamine, N-isopropyldiethanolamine, N-butyldiethanolamine, N-isobutyldiethanolammine, N-oleyldiethanolamine, N-stearyldiethanolamine, ethoxylated coconut oil amine, N-allyldiethanolamine, N-methyl-diisopropylamine, N-propyldiisopropylamine, N-butyldiisopropylamine, N-cyclohexyl-diisopropylamine, N,N-dioxyethylaniline, N,N-dioxyethyltoluidine, N,N'-dioxyethyl-piperazine, dimethyl-bis-oxyethyl-hydrazine, N-hydroxyethylpiperazine, polyethoxylated amines such as propoxylated methyl-diethanolamine, and also compounds such as N-methyl-N,N'-bis-aminopropylamine, N-aminopropylene, N'-dimethylethylenediamine, N-(aminopropyl)-N-methyl-ethanolamine, N,N'-(-aminopropyl)-N,N'-dimethylethylene amine, N,N'-bis-oxyethyl-propylenediamine, 2,6-diaminopyridine, diethylaminopropionamide, N,N-bis-oxyethylphenylthiosemicarbazide, N,N-bis-oxyethylmethylsemicarbazide,p,p'-bisaminomethyldibenzylnethylamine,2-dimethylamino-2-methyl-propanediol-1,3, and also N-n-butyldiethanolamine, N-tert.-butyldiethanolamine, N-methyldipropanolamine, 1,4-bis-hydroxyethylpiperazine, as well as N,N-bis(2-hydroxyethyl)p-toluidine. The diol which contains amino groups preferably only contains one to two tertiary nitrogen atoms, and its molecular weight is generally less than 350, preferably less than 200.

The polyester urethane resin preferably has a number average molecular weight (Mn) of 3000 to 200,000, most preferably less than 50,000. The amine number can be controlled by the amount of compounds which contain cationic groups. At least one tertiary amino group is preferably present per molecule.

Suitable cationic polymers can be produced by known methods. Thus, for example, polyol mixtures, preferably linear polyols, can be mixed with diisocyanates in a molar ratio of 0.6 to 1.4:1. The reaction is conducted, for example, at temperatures from 20° to 150° C., optionally with the addition of catalysts. The reaction products of dicarboxylic acids with diols, such as those which correspond to the prior art, are preferably used as polyester polyols. In addition, condensation products of hydroxycarboxylic acids or polyester diols produced from lactones can also be used. It is also possible to use polycarbonate diols, particularly beta-hydroxyalkyl carbamates and OH-functional acrylates.

In this respect, up to 97% of the polyol mixture may consist of polyethers or polyesters which contain OH groups, and up to 30% by weight of the amount of polyol may comprise low molecular weight dialkanols with a molecular weight of 60 to 350. The number of ionic groups in the binder vehicle is preferably 0.4 to 6% by weight with respect to the solids content. The reaction may be conducted in inert solvents or it may be conducted in the melt, for example.

Examples of anionic binder vehicles A2) for use in aqueous base lacquers are described in EP-A-0 089 497, DE-A-41 15 042 and DE-A-39 10 829. These are binder vehicles based on (meth)acrylic ester polymers, polyesters, polyethers, polyurethanes or on epoxy resin reaction products. They contain anionic groups incorporated in their molecule, preferably carboxyl groups.

Examples include polyurethanes, i.e. the reaction products of what are preferably linear polyols based on polyester polyols or polyether polyols, with isocyanates, preferably diisocyanates, wherein proportions of substances which contain anionic groups and which comprise two functional groups which are reactive towards isocyanates, e.g. dihydroxyalkanoic acids, are reacted in conjunction. The reaction of the individual components may be conducted in steps, or the synthesis may be effected in admixture. A branched structure can optionally be built up by proportions of alcohols or isocyanates of higher functionality. Polymers which contain terminal OH groups and which are dispersible in water can thereby be formed after neutralisation of the ionic groups, or prepolymers can be produced which contain terminal NCO groups, and the chains of which can be extended with amines or with water, for example.

Further examples of binder vehicles which can be used according to the invention are described in DE-A-36 28 125, EP-A-260 447 or DE-A-36 28 124. These are binder vehicles based on polyesters and/or poly(meth)acrylates which contain OH groups. The polyacrylates preferably have a number average molecular weight Mn of 40,000 to 200,000, and preferably have an OH number of 60 to 250 and an acid number up to 80. Their glass transition temperature is between −50° and +150° C., for example. Poly(meth)acrylate binder vehicles can be produced by the radical-induced reaction of alpha,beta-unsaturated carboxylic acids with monomers which contain hydroxyl groups or polyunsaturated monomers and which also comprise other unsaturated, unreactive monomers.

The modified polyesters can be produced by the reaction of aqueous solutions of COOH— functional polyesters, for example, with unsaturated monomers. These solutions are reacted with unsaturated monomers and comprise a content of emulsifiers. The monomers used can also comprise functional groups, e.g. —COOH, —OH or epoxide. However, it is also advantageous if unreactive monomers are also used. Bases are employed during production, for the neutralisation of proportions of the ionic groups. The number average molecular weight (Mn) is preferably 2000 to 100,000. Production can be effected by customary methods known to one skilled in the art.

Up to 50% by weight of crosslinking agent B) may be added, with respect to the sum of the weights of the solids of A) and B), in order to achieve a better match to the application technology properties of the coating media. These crosslinking agents may be neutral, or they may optionally contain the same ionic groups as lacquer binder vehicle A). Neutral crosslinking agents which are optionally dispersible in water are preferably used, however. Amine-formaldehyde condensation resins and/or blocked polyisocyanates are preferred. Examples of mixtures such as these are described in DE-A-40 11 633 or in DE-A-40 00 889. The crosslinking agents may optionally themselves be water-thinnable, or they may be capable of being converted into a water-soluble form together with the ionic base resins. 2 to 25% by weight of crosslinking agent, with respect to the sum of the weights of solids of A) and B), are preferably used. Components A) and B) may optionally be mixed hot or cold in the form of resins, or they may be mixed with each other as aqueous dispersions. In this connection, no chemical reactions which result in crosslinking or gel formation should occur under production and storage conditions.

Partially- or highly-etherified amine-formaldehyde condensation products may be used, for example. These have already been described in detail in the literature.

In addition, the polyisocyanates which are already known from the literature, and which also include diisocyanates, may also be used, wherein reactive isocyanate groups are blocked by protective groups. NCO prepolymers, or oligomeric reaction products of diisocyanates with what are optionally low molecular weight polyols, may also be used. The known blocking agents are used, optionally in admixture also, and groups with different reactivities may also be used.

Binder vehicles C) which can be used according to the invention are resins which contain ionic groups incorporated by reaction. These ionic groups may be anionic groups, preferably carboxyl groups, or they may be cationic groups, preferably amino groups. Other hydrophilic, non-ionic groups may also optionally be present, in order to assist the dispersibility in water. In particular, resins C) which are used according to the invention are those which can be used as paste resins. In this respect, the binder vehicle may be added in admixture as a pigment paste or may be added to the lacquer as an additive.

Examples of these binder vehicles include those based on polyesters, polyurethanes or on reaction products of epoxy resins. These paste resins have a number average molecular weight (Mn) up to about 30,000 and an acid number of 10 to 90, for example, or have an amine number of 20 to 150 as a cationic resin. After the neutralisation of at least part of the groups, the resin can be converted into the aqueous phase.

Paste resin binder vehicles such as these are described in DE-A-40 00 889 for example. These preferred paste resins are those based on polyester urethanes which contain anionic groups. In particular, these resins have a number average molecular weight (Mn) of 200 to 30,000 and can be converted into the aqueous phase after neutralisation of 70 to 100% of the ionic groups.

These paste resins are produced, for example, by the reaction of saturated polyester polyols in admixture with diols, a portion of which contains at least one acid group capable of forming anions, with one or more diisocyanates, in an OH:NCO ratio of 1.0 to 1.5:1. The reaction is conducted at temperatures of 20° to 150° C., for example, optionally with the addition of catalysts, such as amines and organic azo compounds for example.

Polyester polyols obtained from dicarboxylic acids and diols or those based on hydroxycarboxylic acids may be used as polyols, for example. In order to be able to dissolve the polyester urethane resins in water, proportions of diols are used which also contain at least one neutralisable acid group. Examples of suitable compounds which are capable of forming anions include dimethylolpropionic acid or 2,2-dimethylolpropanephosphonic acid. The diisocyanates which are typically used in lacquers are examples of diisocyanates which are suitable for the formation of polyester polyurethanes. They may be aliphatic, alicyclic, arylaliphatic or aromatic. Isocyanates are preferably used which contain a non-aromatic C atom, which is optionally substituted, in the alpha position in relation to the NCO group.

The equivalent ratio of the diisocyanates used is selected to match the polyols used so that the final polyester urethane resin preferably has a number average molecular weight (Mn) of 3000 to 50,000.

After the neutralisation of 70 to 100% of the ionic groups by ammonia or by primary, secondary and/or tertiary alkyl- and/or alkanolamines, for example, the paste resin can be converted into the aqueous phase. Colloidally dispersed solutions are preferably produced. Aqueous dispersions of resins C) can be used as a paste resin, for example, i.e. pigment pastes can be produced from the aqueous dispersions of resins C) for example, i.e. pigments and/or solid additives can be dispersed in these aqueous binder vehicle solutions using known dispersing devices.

Examples of substances which can be used as cationic paste resins include polyurethane resins based on OH-containing polyesters in admixture with low molecular weight diols, and optionally with triols, which are reacted with diisocyanates. No crosslinked products should be produced in the course of this procedure. A portion of the diols is replaced by diol compounds which contain amino groups, which ensure the solubility in water of the resulting binder vehicle after neutralisation. The products have a number average molecular weight (Mn) of 2500 to 30,000 and an amine number of 10 to 150, preferably 40 to 100, for example.

The coating media according to the invention contain binder vehicle components A), B) and C). A) and B) contain ionic groups of the same charge, which are either cationic or anionic. The ionic groups of the same charge may be groups of different chemical nature. The binder vehicles may consist of one binder vehicle or of mixtures of binder vehicles. Paste resin C) has an ionic charge which is opposite to that of A) and B). It is present in amounts such that 0.7 to 70% of the number of charges of the ionic groups of A) and B), preferably 0.5 to 50 %, most preferably 1 to 30%, are neutralised. The use of cationic binder vehicles A) and B) together with anionic paste resins C) is particularly preferred.

In addition, other constituents may be present in the coating medium. The amount and type of additives depends on the purpose of use of the coating media.

The coating media according to the invention can be used as a primer coat, as a base lacquer coat, as a covering lacquer coat or as a clear lacquer coat. Additives may be used, depending on the purpose of use. The pigmentation is matched to the purpose of use. Thus, for example, anti-corrosion pigments are employed when the coating medium is used as a primer, or transparent pigments or additives are optionally employed when it is used as a clear lacquer.

Known rheological additives of organic or inorganic types may be contained as additives, for example. These may act as thickeners, for example. Examples of thickeners include water-soluble cellulose ethers, synthetic polymers containing ionic groups and/or groups with an associative effect, such as polyvinyl alcohol, poly(meth)acrylamide, poly(meth)acrylic acid, polyvinylpyrrolidone, styrene, maleic anhydride copolymers and derivatives thereof, and also hydrophobically modified, ethoxylated polyurethanes or polyacrylates. PUR thickeners which contain amino groups, which are optionally partially crosslinked, and which have an amine number of 60 to 780, preferably 150 to 300, are preferably used. Microgels may also be used in order to control the rheology. It should be ensured that the ionic groups of the thickener, if present, correspond to the polarity of the binder vehicle.

Effect pigments or colour-imparting pigments can be used as pigments. Examples of pigments such as these include inorganic pigments such as titanium dioxide, carbon black and iron oxides and/or organic pigments such as phthalocyanine, quinacridone and/or halogenated thioindigo pigments. Effect pigments such as finely divided metallic pigments or iridian pigments can also be used. In addition, extenders such as barium sulphate, french chalk or layer silicates may be used. It is also possible optionally to add transparent pigments in order to obtain special effects. For use as a primer coat material, anti-corrosion pigments are also added, such as zinc phosphate, which may optionally be modified, lead compounds, chromate compounds or organic anti-corrosion pigments. If clear lacquer coatings are produced, transparent pigments such as micronised titanium dioxide, micronised barium sulphate or microdisperse hydrated silica can be used, for example.

Customary surface-active or interfacially-active substances may also be contained as additives, e.g. wetting agents or anti-foaming agents. Catalysts may also be used if necessary.

The customary substances which are necessary for neutralising the binder vehicles are also contained. Examples of these include inorganic or organic acids for the neutralisation of basic groups, or organic or inorganic bases for the neutralisation of acidic groups. The pH of the aqueous coating medium should be 5 to 8, and should be 6.5 to 7.5 for metallic basecoats in particular.

Furthermore, small amounts of organic solvents may be added to the coating medium in order to control the solubility or viscosity behaviour. These are generally water-thinnable solvents. Examples of solvents such as these include glycols such as ethylene glycol, ethoxyethanol, diethylene glycol, methoxypropanol, ethoxypropanol, dipropylene glycol dimethyl ether, diacetone alcohol, alcohols such as ethanol, n-butanol or N-methylpyrrolidone, or mixtures thereof. In order to improve the flow of the coating medium, proportions of high-boiling solvents may also be added, such as saturated hydrocarbons, e.g. petroleum fractions, hexylene glycol, phenoxyethanol or 2,2,4-trimethylpentanediol-1,3 monoisobutyrate. The proportion of organic solvents is as small as possible. For example, it is less than 15%, preferably less than 5% by weight.

The production of pigment pastes from paste resins is known in principle. For example, a pigment paste can be produced from a solvent-containing binder vehicle mixture by comminution, or is preferably produced by comminution in a neutralised aqueous binder vehicle dispersion with the addition of additives and pigments. In particular, it is also possible to disperse solid additives which are difficultly soluble in water in the paste resin. Suitable dispersion units include disc agitator devices, triple roller mills, ball mills, or sand or bead mills. Small amounts of water or solvents may be added in order to adjust the viscosity of the pigment paste for comminution.

The pigment pastes contain 5 to 65% by weight of pigment and/or extenders together with 10 to 70% by weight of paste resin, for example. 0 to 40% by weight of water and 0 to 20% by weight of one or more organic solvents are present. The pigment pastes obtained are stable on storage and do not settle out.

The finished coating medium is produced from the pigment pastes and from the aqueous binder vehicle dispersions. In the course of this procedure, the pigment or additive paste may be added to the total amount of counterionic binder vehicle. Preferably, either the lacquer binder vehicle mixture is added in the form of a dispersion to the mixture comprising the aqueous pigment paste which optionally contains aluminium bronze paste, or the aqueous pigment paste is mixed with the binder vehicle dispersion, which is optionally mixed with aluminum bronze paste, additives and thickener solutions. Good homogenisation during the mixing process should be ensured. The mixture of aluminium bronze and aqueous paste can be obtained in a form which is particularly stable on storage by appropriately selecting the binder vehicles.

If binder vehicle C) is added only as an additional additive component, it may be added in the form of an aqueous solution for example. Other additives may optionally be dissolved therein.

No flocculation of the pigments or precipitation of the binder vehicles is observed. The water-thinnable coating media which are produced from the pigment pastes and the binder vehicle dispersions can be used as industrial lacquers, particularly in the automobile industry for example. If they contain aluminium platelets, for example, they are used as metallic lacquers. If they contain coloured covering pigments, they can be used as single-colour base lacquers or as covering lacquers. If they contain transparent pigments or no pigments, they can be used as clear lacquer coating media. If they contain anti-corrosion pigments or adhesion-promoting substances, they can be used as a primer on metal or plastics substrates.

Depending on the purpose of use, physically drying systems, or chemically crosslinking single-component or two-component systems can be obtained.

The coating media according to the invention are applied by known methods such as dipping, spraying, pouring, brushing or flooding. Spray application is preferably employed, most preferably compressed air spraying, airless spraying, hot spraying or electrostatic spraying. If the coating media are used as primer surfacer coating media, they are overcoated with subsequent coating media after application. If the coating media are used as a base lacquer, a clear lacquer coat is preferably applied wet-into-wet. This may consist of known clear lacquer coating media, e.g. two-component clear lacquers, high-solids clear lacquers, aqueous clear lacquers, UV-curing clear lacquers or clear powder coatings.

If the coating media according to the invention are used as clear lacquer coating media, they are generally applied to a thermally crosslinked base lacquer or are preferably applied wet-into-wet on to a base lacquer. After the application of the clear lacquer coating medium, it is crosslinked by subjecting it to an elevated temperature.

The applied films are cured or hardened by known methods. Depending on the coating medium and on the crosslinking system selected, they may be dried or crosslinked at room temperature or optionally at elevated temperature also. It is possible to dry/crosslink the coats according to the invention individually, or they may be overcoated by the wet-into-wet method and crosslinked together with a further lacquer coat. The temperatures employed here may be between 10° and 180° C., for example. For two-component lacquers the crosslinking temperatures are between 20° and 120° C., for thermally crosslining systems the temperatures are between 100° and 180° C., for example.

The coatings produced according to the invention may be structured as single-layer or as multi-layer coatings. Various substrates are possible, e.g. metal substrates or plastics substrates. These may optionally also be pre-coated. The coating media according to the invention are applied to these substrates. It is possible to use only one coating medium according to the invention, or a plurality of coating media can be applied in succession.

Multi-layer coatings with the coating medium according to the invention are characterised by good adhesion and good technological properties. They can be used in industry for coating metal and/or plastics surfaces, e.g. refrigerators, and are particularly suitable for the coating of motor vehicles. They can be used both in mass-production coating operations and in coating operations for repair purposes. Very good visual properties, together with excellent hardness and elasticity properties and an outstanding resistance to weathering, are obtained by means of the coating media according to the invention.

PRODUCTION EXAMPLE 1

(amino-poly(meth)acrylate resin 725 g butoxyethanol were heated under an inert gas to 110° C. in a vessel fitted with a reflux condenser. A mixture comprising 192 g hydroxyethyl acrylate, 137 g butenediol monoacrylate, 228 g glycidyl methacrylate, 364 g 2-ethylhexyl acrylate, 439 g butyl methacrylate, 438 g methyl methacrylate, 90 g styrene and 44 g azo-bis-isobutyronitrile was added over 3 hours. The batch was then held at 110° C. for 1 hour, 6 g azo-bis-isobutyronitrile were added, and this procedure was repeated after a further hour. A solids content of 72.2% by weight was measured after 3 hours at 110° C. and a viscosity of 2.14 Pa.s was measured at 25° C. after diluting to 60% by weight with butoxyethanol. After cooling to 50° C., a mixture of 120 g diethylamine and 201 g isopropanol was rapidly added (1.10 mole amine to 1.00 mole epoxide). After 30 minutes the batch was heated to 65° C. and then held for 2 hours, followed by heating to 105° to 110° C. and holding for 3 hours. After cooling to 80° C., the isopropanol and the excess amine were carefully removed by distillation under vacuum. The solids content was adjusted to about 78% by weight with butoxyethanol.

Final values: solids content: 78.7% by weight (heating at 150° C. for 30 minutes); amine number: 45 mg KOH per g solid resin viscosity: 3.44 Pa.s (60% by weight solution in butoxyethanol at 25° C.)

The resin had a stable viscosity on storage, and after combination with crosslinking agents it gave non-yellowing, smooth surfaces.

PRODUCTION EXAMPLE 2

(polyurethane dispersion)

912 g of a polyester (synthesised from adipic acid, isophthalic acid, 1,6-hexanediol and neopentyl glycol, and with an OH number of 113 and an acid number of 1) was mixed at about 45° C., in a reaction vessel fitted with a stirrer, an internal thermometer, a heater and a reflux condenser, with 191 g methyldiethanolamine and 185 g N-methylpyrrolidone. 697 g isophorone diisocyanate were then slowly added and the exothermic reaction was maintained at 80° C. by cooling and heating until the NCO number was about 3.3. After adding 185 g N-methylpyrrolidone, the batch was cooled to room temperature. 32.6 g ethylenediamine in 485 g of dry acetone were added over 5 minutes, whereupon the temperature increased to 35° C. After 10 minutes, a mixture of 11152 g deionised water and 63.4 g formic acid (85%) was stirred in, and thereafter an emulsion was produced by adding 2026 g water. The acetone was distilled off by heating to 90° C., optionally with the application of a vacuum.

Final values: solids content: 42% by weight (heating at 150° C. for 60 minutes) amine number: 52 mg KOH per g solid resin MEQ value: about 60 (milliequivalents of acid per g of solid resin) degree of neutralisation: 75%

PRODUCTION EXAMPLE 3

885 g of a polyester (synthesised from adipic acid, isophthalic acid, 1,6-hexanediol and neopentyl glycol, and with an OH number of 105 and an acid number of 1.4) and 170 g 2-(dimethylaminomethyl)-2-ethyl-1,3-propanediol were mixed in 300 g acetone and at 45° C., in a reaction vessel fitted with a stirrer, an internal thermometer, a heater and a reflux condenser.

410 g isophorone diisocyanate were then added so that the temperature was maintained at 80° C. When an NCO number less than 0.1 was reached, 53 g formic acid (85% solution in water) were added and stirred in well. After adding 3100 g deionised water, a finely divided polyurethane dispersion was obtained. The acetone was distilled off under vacuum.

Final values: solids content: 35% by weight, 60 minutes, 150° C., amine number: 45 MEQ acid: about 65 pH: about 5.7.

PRODUCTION EXAMPLE 4

(paste resin 1)

1687 g of a linear, saturated polyester (synthesised from adipic acid, and from neopentyl glycol and 1,6-hexanediol in a molar ratio of 1:1), which had a hydroxyl number of 104 and a viscosity at 25° C. of 2.6 Pa.s were mixed in the cold, whilst being well stirred, with 275 g dimethylolpropionic acid and 796 g dicyclohexylmethane diisocyanate. After the exothermic reaction had subsided, the batch was heated and maintained at 120° C. until the NCO content was less than 0.8%. Thereafter it was diluted with 888 g butoxyethanol:

| | |
|---|---|
| solids content (30 minutes at 150° C.) | 75% by weight |
| acid number (with respect to the solids content) | 38 |
| viscosity (at 25° C.) | 60 mPa.s* |
| after dilution to 40% with butoxyethanol. | |

A mixture of 88.6 g dimethylisopropanolamine and 88.6 g water was then rapidly added to 1920 g of this resin solution. After stirring slowly for 15 minutes, the batch was diluted with 2350 g water to give a highly viscous paste which was almost clear and which had the following final values:

| | |
|---|---|
| solids content (30 minutes at 150° C.) | 34.1% by weight |
| viscosity (at 25° C.) | 400 mPa.s* |
| MEQ value | 55 |
| pH | 8.6 |

PRODUCTION EXAMPLE 5

(paste resin 2)

1395 g of a linear, saturated polyester (synthesised from adipic acid and hydroxypivalic acid neopentyl glycol ester), which had an OH number of 112 and a viscosity at 25° C. of 8.7 Pa.s were mixed, whilst being well stirred, with 161 g dimethylolpropionic acid and 163 g trimethylpropane in a reaction vessel fitted with an internal thermometer and a reflux condenser. The batch was heated to 90° C. to effect dissolution and was then cooled to 50° C. After slowly adding 865 g tetramethylxylylene diisocyanate the batch was heated and maintained at 120° C. until the NCO content was less than 0.2%. Thereafter it was diluted with 861 g butoxyethanol:

| | |
|---|---|
| solids content (30 minutes at 150° C.) | 75% by weight |
| acid number (with respect to the solids content) | 27 |
| viscosity (at 25° C.) | 210 mPa.s* |
| diluted to 40% with methoxypropanol. | |

A mixture of 58.3 g dimethylethanolamine and 58.3 g water was rapidly added to 1963 g of this resin solution, and the batch was heated to 80° C. It was thereafter slowly diluted with 2585 g water to give a highly viscous, turbid paste which could readily be processed when hot, and which had the following characteristic properties:

| | |
|---|---|
| solids content (30 minutes at 150° C.) | 32.3% by weight |
| viscosity (at 25° C.) | 1.3 Pa.s* |
| MEQ value | 42 |
| pH | 7.6. |

PRODUCTION EXAMPLE 6

(paste resin 3)

551 g of a linear, saturated polyester (synthesised from adipic acid and 1,6-hexanediol), which had an OH number of 86, were dissolved at 50° C., whilst being well stirred, with 59.7 g cyclohexanedimethanol and 64 g dimethylolpropionic acid in 297 g N-methylpyrrolidone, in a reaction vessel fitted with an internal thermometer and a reflux condenser. 216 g hexane diisocyanate were slowly added so that the temperature did not rise above 55° C. After the exothermic reaction had subsided, the batch was maintained at 65° C. until the NCO content was less than 0.8%. It was subsequently diluted with 26.7 g methanol.

| | |
|---|---|
| solids content (30 minutes at 150° C.) | 73.4% by weight |
| acid number (with respect to the solids content) | 31 |
| viscosity (at 25° C.) | 60 mPa.s* |
| after dilution to 40% in NMP | |
| by gel permeation chromatography: | Mn = 2200 |
| in THF: | Mw = 10,000 |

564 g of this resin solution were heated to 80° C. and a mixture of 24.6 g triethylamine and 24.6 g water was added.

After 5 minutes, the batch was slowly diluted with 103.4 butoxyethanol and 501.6 g water to give a turbid, highly viscous paste which could readily be processed when hot, which had the following characteristic properties:

| | |
|---|---|
| solids content (30 minutes at 150° C.) | 31.6% by weight |
| viscosity (at 25° C.) | 510 mPa.s* |
| MEQ value | 58 |
| pH | 8.9. |

A cationic aqueous base lacquer comprising an anionic colouring paste.

PRODUCTION EXAMPLE 7
(black pigment paste)

300 g of paste resin 1 of a PUR dispersion from production example 4 were mixed with 135 g a commercially available acidic flame-derived carbon black pigment with an average particle diameter of 13 nm, and the pH of the mixture was adjusted to 8 to 9 with a commercially available tertiary amine or amino alcohol. The mixture was diluted with DIW to a solids content of about 50% by weight. This mixture was dispersed in customary dispersing units such as a dissolver, a triple roller mill, a ball mill, a sand mill, a pearl mill or in rotor-stator units until transparent. This pigment concentrate was used for the pigmentation of base lacquers. (DIW=deionised water)

PRODUCTION EXAMPLE 8
(red pigment paste)

350 g of a commercially available vat pigment with a red colour index of 168 were mixed with 300 g of a PUR dispersion according to production example 4. The pH of the mixture was corrected to 8 to 9 with customary neutralising agents e.g. tertiary amines or amino alcohols and the mixture was diluted with DIW to a solids content of about 50% by weight. This mixture was dispersed as described for the black example.

PRODUCTION EXAMPLE 9
(white pigment paste)

60 g of a commercially titanium dioxide (rutile type) pigment were added to 20 g of a PUR dispersion according to production example 4. The pH of the mixture was corrected to 8 to 9 if necessary with customary neutralising agents and the mixture was diluted with DIW to a solids content of 70% by weight.

The mixture was dispersed in a dissolver to give a particle size less than 10 µm.

PRODUCTION EXAMPLE 10
(black pigment paste, cationic)

300 g of the dispersion from production example 3 were mixed with 135 g of a flame-derived carbon black with an average particle diameter of 13 nm. The mixture was diluted with deionised water, without further neutralisation, to give a solids content of 50% by weight.

The mixture was then pre-dispersed in the usual manner in a dissolver and was then dispersed until transparent in known dispersing units, such as a triple roller mill, a ball mill, a sand mill, a pearl mill or in a suitable rotor-stator unit.

PRODUCTION EXAMPLE 11
(red pigment paste, cationic)

300 g of the PUR dispersion from production example 3 were mixed with 350 g of a commercially available vat pigment with a red colour index of 168. The mixture was diluted with deionised water to give a total solids content of 50%. The mixture was dispersed as described in example 6.

PRODUCTION EXAMPLE 12
(white pigment paste, cationic)

200 g of the PUR dispersion from production example 3 were mixed with 600 g of a commercially titanium dioxide of the rutile type. The pH of the mixture was adjusted to 5 to 7 with customary neutralising agents such as tertiary amines or amino alcohols and the mixture was diluted with deionised water to a total solids content of 70%. The mixture was dispersed in a dissolver to give a particle size less than 10 µm. The pigment concentrates obtained were used for colouring water-thinnable base lacquers.

AQUEOUS BASE LACQUER ACCORDING TO THE INVENTION

PRODUCTION EXAMPLE 13
(single-colour base lacquer, black)

530 g of the binder vehicle from example 1 were placed in a vessel. 50 g of black pigment paste according to production example 7 were stirred in.

The following were added to the batch, with stirring: 100 g of a dispersion according to production example 1, and then 150 g of that according to production example 3, 60 g of a commercially available, medium-reactivity, water-thinnable melamine resin with a solids content of about 75% by weight in a solvent, and optionally a commercially available anti-foaming agent in an amount of 5 to 20 g.

PRODUCTION EXAMPLE 14
(single-colour base lacquer, red)

As for the black example, except that 50 g of the red pigment paste were used instead of 50 g of the black pigment paste.

PRODUCTION EXAMPLE 15
(metallic base lacquer according to the invention)

66 g of a commercially available aluminium bronze for water-thinnable base lacquers were digested with 65 g butyl glycol and 16 g N-methylpyrrolidone. 50 g of a customary, polymer-based thickener were stirred in for stabilisation. The following were then stirred in successively: 680 g of the resin from production example 1, and 65 g of the crosslinking agent as used in the black base lacquer. A maximum of 20 g of a commercially available anti-foaming agent and, depending on the desired colour, 20 to 50 g of the black and/or red pigment concentrate according to production example 7 or 8 were optionally stirred in.

The viscosity of all the base lacquers was adjusted with DIW to the spraying viscosity of about 50 to 80 mPa.s.

The base lacquers were applied by spraying to primed metal panels (anti-corrosion lacquer+stoved primer surfacer), to give a coat thickness, corresponding to their hiding power, of 12 to 20 µm for metallics and up to 50 µm for single-colour base lacquers. After a short period of intermediate drying, e.g. at 10° C. to 80° C., they were overcoated with a commercially available single-component, melamine-resin curing clear lacquer or with a two-component, isocyanate-curing clear lacquer (water-thinnable or solvent-thinnable), and the coats were dried jointly at temperatures between 80° C. and 150° C. for 20 to 45 minutes.

In a comparative test, the structure of a clear, melamine resin-curing stoving lacquer exhibited perceptible advantages compared with a purely anionic or purely cationic base lacquer (see comparative example 16), particularly as regards resistance to water of condensation and adhesion testing.

Comparative example 16

555 g titanium dioxide were added to 945 g of an amino-poly(meth)acrylate resin according to production example 1 and dispersed for 5 minutes in a dissolver. The paste was then comminuted for 40 minutes in a bead mill at temperatures up to 60° C.
Solids content: 86.6% by weight (after heating for 30 minutes at 150° C.) pigment-binder vehicle ratio=0.75:1.

772 g of the paste were well stirred together in a dissolver with 111 g of a high molecular weight melamine resin (as an 80% solution in isobutanol) containing methoxy-imino groups, and with 17.7 g of an amine-blocked sulphonic acid (25%) as a catalyst. The mixture was subsequently further diluted in the dissolver, firstly with 7.6 g formic acid (85%) and then slowly with 142 g of deionised water. After standing overnight, 100 g of the lacquer were adjusted with 62 g deionised water to a spraying viscosity of 30 seconds in a flow cup (DIN 53 211) and were sprayed on to primed metal panels with an automated spraying device.

The base lacquer was pre-dried for 6 minutes at 80° C. and was subsequently overcoated with about 40 μm of aqueous clear lacquer according to production example 17. It was pre-gelled for 15 minutes at 80° C. and thereafter both coats were jointly stoved for 20 minutes at 120° C. (under-stoving conditions).

PRODUCTION EXAMPLE 17
(aqueous clear device according to DE-A-39 10 829, Example 3)

Production of a polyester oligomer 336.7 g trimethylolpropane, 366.8 g adipic acid and 297 g hexanediol were esterified with 5 g hypophosphorous acid at 180° C. to 230° C. in the melt, to give an acid number of 20, in a 2 litre three-necked flask fitted with a stirrer, separator trap, thermometer and reflux condenser.

The batch was subsequently condensed under vacuum down to an acid number <1.5. The product obtained in this manner had a residue after stoving of 94.5% by weight (1 hour at 150° C.), a viscosity of 3200 mPa.s (100%), a hydroxyl number of 460 and a Hazen colour of 30.

Production of polyester oligomer polyacrylates 717 g of the polyester oligomer produced as above were heated under reflux at 81° C. with 597 g ethanol in a 4 litre three-necked flask fitted with a stirrer, reflux condenser, dropping funnel and thermometer. A mixture comprising 552 g butanediol monoacrylate, 996 g tert.-butyl acrylate, 74 g acrylic acid and 50 g Vazo 67 (2,2-azo-bis-2-methylbutyronitrile) was then added drop-wise over 4 hours and was subsequently polymerised for 4 hours. The product had a residue after stoving of 79.8% by weight (1 hour at 150° C.), a viscosity of 7200 mpa.s (DIN 53 015), an acid number of 26.3, an OH number of 231 and a Hazen colour of 60.

Production of the water-thinnable clear lacquer 651.2 of the polyester oligomer polyacrylate produced as above, 348 g of a commercial melamine resin with a high imino-functionality, and 152.8 g ethanol were pre-mixed well with a laboratory stirrer, and were treated, with further stirring, with a mixture comprising 50.7 g butoxyethanol, 20.7 g of a UV absorber of the benzotriazole type and 13.7 g of a radical scavenger of the HALS type (HALS=hindered amine light stabiliser). Thereafter, the batch was neutralised, with stirring, with 27 g dimethylethanolamine, stirred for a further 15 minutes, and was then diluted with a mixture comprising 972.6 g deionised water and 15.4 g ethanol. The lacquer had a viscosity of 31 seconds (as measured in DIN cup 4 at 20° C.) and a pH of 9.0.

We claim:

1. Coating media, containing an aqueous mixture comprising:
   I. 99–70% by weight of
      A) 50–100% by weight of one or more binder vehicles which at least in part contain ionic groups,
      B) 0–50% by weight of one or more crosslinking agents, which at least in part may contain ionic groups, for binder vehicle A), wherein the ionic groups which are present have the same charge as those of component A), and
   II. 1–30% by weight of one or more binder vehicles (component C) in the form of an aqueous dispersion, wherein component C) is added in the form of a pigment paste which contains 5–65% by weight of at least one member selected from the group consisting of pigments and extenders together with 95–35% by weight of the resin of component C), wherein the binder vehicles are miscible both with the binder vehicles of component A) at the storage temperature and with each other at the curing temperature of the coating media and which contain ionic groups, the charge of which is opposite to the charge of the ionic groups of component I), and wherein at least a portion of the ionic groups is neutralized, and wherein the percentages by weight are given with respect to the weight of resin solids in each case and wherein the proportions of components I) and II) are matched to each other so that 0.5 to 70% of the number of charges of the ionic groups of I) are neutralized by the charges of the ionic groups of II), and
   III. at least one lacquer additive selected from the group consisting of pigments, extenders and solvents.

2. Coating media according to claim 1, characterised in that component I contains ionic groups corresponding to an amine number of 20 to 200 or corresponding to an acid number of 5 to 80, and the binder vehicles of component C) contain ionic groups corresponding to an acid number of 10 to 90 or to an amine number of 10 to 150.

3. Coating media according to claim 2, characterised in that the pigment paste contains 0 to 40% by weight water and/or 0 to 20% by weight of one or more organic solvents, wherein the percentages by weight are given with respect to the total pigment paste in each case.

4. Coating media according to claim 1, characterised in that component A) contains one or more cationic binder vehicles, component B) contains one or more cationic and/or neutral crosslinking agents, and component C) contains one or more anionic binder vehicles.

5. Coating media according to claim 1, characterised in that component A) contains one or more anionic binder vehicles, component B) contains one or more anionic and/or neutral cross-linking agents and component C) contains one or more cationic binder vehicles.

6. Coating media according to any one of claim 1, characterised in that component A) contains one or more cationic binder vehicles, which are resins comprising ethylenically unsaturated monomers, poly(meth)acrylate resins, polyester resins and/or polyester urethane resins, each containing basic groups neutralisable by acids calculated as an amine number of 20 to 200, and with a number average molecular weight (Mn) of 500 to 50,000 and a hydroxyl number of 0 to 450.

7. Coating media according to any one of claim 1, characterised in that component A) contains one or more anionic binder vehicles which are (meth)acrylic ester polymers, polyesters, polyethers, polyurethanes and/or epoxy resins, each with a number average molecular weight (Mn) of 2000 to 200,000, anionic groups corresponding to an acid number of 5 to 80, and an OH number of 60 to 250.

8. Coating media according to claim 1, characterised in that component C) contains one or more binder vehicles based on polyesters, polyurethanes or reaction products of epoxy resins, which each have a number average molecular weight (Mn) of 2000 to 30,000 and contain anionic groups corresponding to an acid number of 10 to 90.

9. Coating media according to claim 1, characterised in that component C) contains one or more binder vehicles based on polyesters, polyurethanes or reaction products of epoxy resins, which each have a number average molecular weight (Mn) of 2000 to 30,000 and contain cationic groups corresponding to an amine number of 10 to 150.

10. A process for producing single-layer or multi-layer coatings, characterised in that a substrate, which is optionally coated, is provided with a coating comprising a coating medium according to claim 1 and optionally one or more further coatings are applied.

11. A process according to claim 10, characterised in that it is carried out for the coating of motor vehicles or parts thereof.

12. The use of the coating media according to claim 1 for the production of single-layer or multi-layer coatings.

13. The use of the coating media according to claim 1 as primer coats, primer surfacer coats, base lacquers, covering lacquers or clear lacquers, particularly in the motor vehicle sector.

* * * * *